United States Patent [19]

Keppeler

[11] Patent Number: 4,897,002
[45] Date of Patent: Jan. 30, 1990

[54] METHOD AND APPARATUS FOR MAKING IRREGULAR SECTIONS

[76] Inventor: Robert C. Keppeler, 8721 Rhodes Ct., Santee, Calif. 92071

[21] Appl. No.: 202,372

[22] Filed: Jun. 6, 1988

[51] Int. Cl.$^4$ .............................................. B23D 3/00
[52] U.S. Cl. ................................ 409/293; 29/156.8 R; 409/199; 409/310; 409/313
[58] Field of Search ................... 29/156.8 B; 409/293, 409/310, 313, 317, 131, 132, 166, 168, 199

[56] References Cited

U.S. PATENT DOCUMENTS

| | | | |
|---|---|---|---|
| 569,595 | 10/1896 | Amstutz | 409/293 |
| 1,438,389 | 12/1922 | Mitchell | 409/310 |
| 1,646,915 | 10/1927 | Kelly | 409/313 |
| 2,741,164 | 4/1956 | Smedley | 409/293 |
| 2,905,062 | 9/1959 | Praeg | 409/313 |
| 2,916,973 | 12/1959 | Barton | 409/313 |
| 3,143,293 | 8/1964 | Krzyszczuk | 409/313 |
| 4,436,461 | 3/1984 | Di Martino | 403/313 |
| 4,728,233 | 3/1988 | Stanford | 409/313 |

Primary Examiner—Howard N. Goldberg
Assistant Examiner—Irene Cuda
Attorney, Agent, or Firm—William H. Maxwell

[57] ABSTRACT

A method and apparatus for machining fragile workpieces of any material, by placing the workpiece upon a convex support, tensioning the workpiece into coextensive engagement over the support, and moving a cutting tool away from an anchored end of the workpiece to establish transverse and longitudinal configurations at exposed sides of the workpiece when removed from the support.

36 Claims, 4 Drawing Sheets

METHOD AND APPARATUS FOR MAKING IRREGULAR SECTIONS

BACKGROUND OF THE INVENTION

This invention relates to the formation of fragile parts of changing cross sections, which have been difficult to manufacture, it being a primary object of this invention to provide securement means by which work is firmly held for removal of material. Heretofore, work pieces have been held by chucks, vices or clamps, etc. and they have been cemented in place for machining. Also, ferrous work pieces have been secured to magnetic chucks while non ferrous work pieces have been secured to vacuum chucks, etc. Because of the difficulty in securement of fragile work pieces, resort has been made to tedious methods of material removal such as chemical milling and electrical discharge milling etc. Furthermore, accuracy of material removal remains a problem even with the aforesaid high tech methods of material removal, it being an object of this invention to provide a machining method and apparatus by which material is removed with extreme facility and accuracy. With the present invention accuracy is inherent so that precision parts are produced economically.

The parts manufactured by this method and apparatus vary widely in material kind and configuration. That is, the material can be ferrous or non ferrous, metallic or non metallic, and of any desired transverse as well as longitudinal cross sectional configuration. For example with respect to fragile parts of irregular shape; ferrous work pieces having thin portions and/or edges cannot be clamped securely and will move in magnetic and vacuum chucks; non ferrous work pieces (metallic or non metallic) will also move in said chucks; and securement by adhesion with a cement or the like is costly and many times deleterious to the material of the part to be produced. Therefore, it is an object of this invention to provide means by which any and all work piece materials are reliably secured for machining.

The work pieces involved here are characterized by thin and/or sharp features subject to deformation, when improperly treated. In this respect, strength of the material and its physical properties are to be considered. That is, the material to be machined may be maleable or resilient, soft or hard, and its tensile strength and tendancy to deform will vary. Therefore, crushing, bending and stretching are to be taken into consideration, it being an object of this invention to preclude any deforming or adverse effect from bending and stretching. However, it is an object of this invention to advantageously employ forming, bending and stretching, as and when circumstances require.

It is an object of this invention to accomodate the accepted methods of material removal as practiced in the machining arts, and for example cutting tools as they are used in lathes and milling machines and the like of all types are to be used. Chemical milling and electrical discharge milling, and all associated means and methods of tool feeds and control are to be employed as may be required. With this invention, the work piece is pulled tightly over a curved support which is traversed by the cutting tool for the removal of material therefrom. Accordingly, it is an object of this invention to provide anchor means and also tensioning means to secure the work piece tightly to the curved support. In practice, the arcuate support is the circumferential curvature of a wheel turned as by a lathe, but this embodiment is not to preclude other curved supports such as those which may be placed upon or associated with conventional milling machines and the like. It is still another object of this invention to advantageously employ the aforesaid tensioning means to stretch materials that will work harden and thereby take a set configuration established by the curved support surface.

The present invention is characterized by the curved supporting surface that positions the work piece under tension. In practice, the work piece is elongated and extends between an anchor means and a tensioning means. And a feature is control over the tension applied to the work piece. Accordingly, it is an object of this invention to provide tension control means by which the work piece is held tightly to the curved support. For work pieces which are to retain their original straight condition, the tension applied is controlled so as not to exceed the yield point of the material. However, for work pieces which are to acquire the form of the curved support, the tension applied is controlled for dynamic movement wherein the yield point of the material is exceeded so as to stretch and set the same. It is to be understood that the support surface is not to be limited to a true arc, but may also be any curvilinear surface.

It is an object of this invention to provide for variations in part contour, both transversely and longitudinally. To this end the tool feed means is controlled both transversely and longitudinally with respect to the support surface, so as to cut transverse as well as longitudinal cross sections as required. In the lathe embodiment herein disclosed, the transverse part cross section may involve grooves, shoulders and tapers and the like. And, in said lathe embodiment, a longitudinal tapered part involves eccentric turning and the like. For example, the arcuate or curvilinear surface will have offset curvatures as required, or the tool feed control means will vary the cutting positions of the tool, as may be required. Position of the cutting tool will be computer or tape controlled, so as to be varied or interrupted as required.

SUMMARY OF THE INVENTION:

The method and apparatus herein disclosed has for its purpose the machining of irregular cross sections, especially in work pieces that are fragile and made of material not conducive to conventional chucking and other holding methods. This invention is characterized by an arcuate or curvilinear support surface for an elongated work piece that is anchored at one or both ends and is controllably tensioned to extend over the support surface upon which it is formed and machined to required contour, both transversely and longitudinally. The arcuate support surface is a sector of a circle the circumference of which is less than 360° (or of the combined and continuing sectors involved), whereas the curvilinear support surface is defined by spaced offset dimensions from a base line or plane. The work piece, for example a length of any flexible material, is anchored at its opposite ends to the ends of the sector or curvilinear support surface, and at least one anchored end is controlled by means tensioning the work piece. For work pieces which are to return to their original length, the elastic limit of the material thereof is not exceeded by the tensioning means. For work pieces which are to take a set in conformity to the support surface contour, the yield strength of the material thereof is exceeded corresponding to a definite amount of permanent set or strain, "yield strength" being the maximum stress that can be applied without permanent deformation of the work piece. Note that not all materials have a yield strength. Subsequent straightening and/or forming proceedures can follow for those parts that require such finishing.

The foregoing and various other objects and features of this invention will be apparent and fully understood from the following detailed description of the typical preferred forms and applications thereof, throughout which description reference is made to the accompanying drawings.

PREFERRED EMBODIMENT:

Referring now to the drawings, the apparatus of this invention is characterized by a support S for a workpice W that is secured thereto by anchor means A at its opposite ends and by tension means T to ensure its tightness. Cutting means C is provided for removing material from the workpiece. The method of this invention can be carried out with the use of various types of apparatus, as will be described, and involves the securement of elongated flexible material to a curved surface to which it is anchored and tensioned for tightness while material removal pressures are applied. The workpiece configuration and material can vary, providing it has flexibility permitting its conformity to the curved support, whether the material is ferrous or non ferrous, metalic or non metalic. It is thin and/or sharp edged work pieces and such parts to be machined and formed with which this invention is particularly concerned.

The method for making irregular sections involves the machining and forming of a workpiece W, especially fragile configurations which are known to be difficult to secure for material removal. For example, the workpiece W can be an elongated strip of flexible sheet metal which is to be machined to a sharp edge (see FIGS. 2-9). In accordance with this method, the first step is to place the flexible elongated workpiece W over a convexly curved support. The second step is to anchor the opposite ends of the workpiece W for its coextensive engagement upon the support between opposite ends thereof. The third step is to tension the workpiece W between its opposite anchored ends. And, the fourth step is to remove material from the workpiece W which presents a convexly curved side exposed by virtue of its conformity to the convexly curved support.

The first step of placing the flexible elongated workpiece W over the convexly curved support will vary dependent upon the configuration of the part to be made and upon the method of material removal to be employed. Length and width of the work piece is to be accommodated, and also the longitudinal as well as transverse configurations of the part are to be considered. Accordingly, the convexly curved support can be arcuate or circular, or it can be curvilinear or involute, as will be described. It is essential, however, that those portions of the workpiece which are to be machined be coextensively engaged upon the convexly curved support. The arcuate or circular support is conducive to the employment of machine tools such as a lathe for material removal about a turning center axis. The curvilinear support is conducive to the employment of machine tools such as a milling machine for rectilinear material removal (or a shaper machine).

The second step of anchoring opposite ends of the elongated flexible workpiece W can vary, in that one or both ends of the workpiece can be anchored, dependent upon the means employed to tension the same as later described. It is preferred that one end of the workpiece is anchored, away from which material removal presures are exerted and applied, also as later described. In practice, the one end of the workpiece is secured to one end of the convexly curved support, with an inside face coextensively engaged upon the support, and with an outside face exposed for machining.

The third step of tensioning the workpiece W between its opposite ends is preferably by pulling at its end opposite the anchored end thereof, thereby tightly engaging the workpiece upon the convexly curved support. Alternately, the opposite ends of the workpiece W are both anchored and the convexly curved support is moved against the workpiece so as to increase or decrease its tension. In practice, spring pressure or hydraulic pressure is applied to tension the workpiece between its ends. In the machining of workpieces that are to return to a straight condition, the pulling force applied does not exceed the elastic limit of the material, or does not exceed the yield strength thereof. However, for workpieces that are to acquire the shape of and set into conformity with the convex shape of the support, the elastic limit and/or yield strength is exceeded, whereby deformation of the material occurs so as to set the workpiece into the required part condition.

The fourth step of material removal is preferably by a single point cutting tool, as shown, when employing a lathe or the like, or by a rotating cutter when employing a milling machine or the like. A feature of this invention is that the material removal pressures are exerted and/or applied so as to pull upon an anchored end of the workpiece W, whereby tensioning of the third step prevails preventing slack that would otherwise develop in the workpiece subjected to longitudinal cutting pressure. Accordingly, securement of the workpiece W to the convexly curved support is dynamic, and thereby ensures tightness for accurate machining.

The apparatus as shown in FIGS. 1 through 10 of the drawings is for use in a lathe or like machine tool, wherein there is a turning axis a, and in which the support S is arcuate or circular. The lathe spindle 10 carries and rotates a faceplate, drum or wheel 11, the perimeter of which provides or carries the support S that presents a convexly curved face 12 and a peripheral locating rib 14 at its back edge. As shown, the support S is a fixture or adapter in the form of a rim or tire affixed to a concentric flange 13 of the wheel. Rotation of the wheel 11 is counter clockwise when facing the spindle 10 and head of the lathe.

Figure 1:
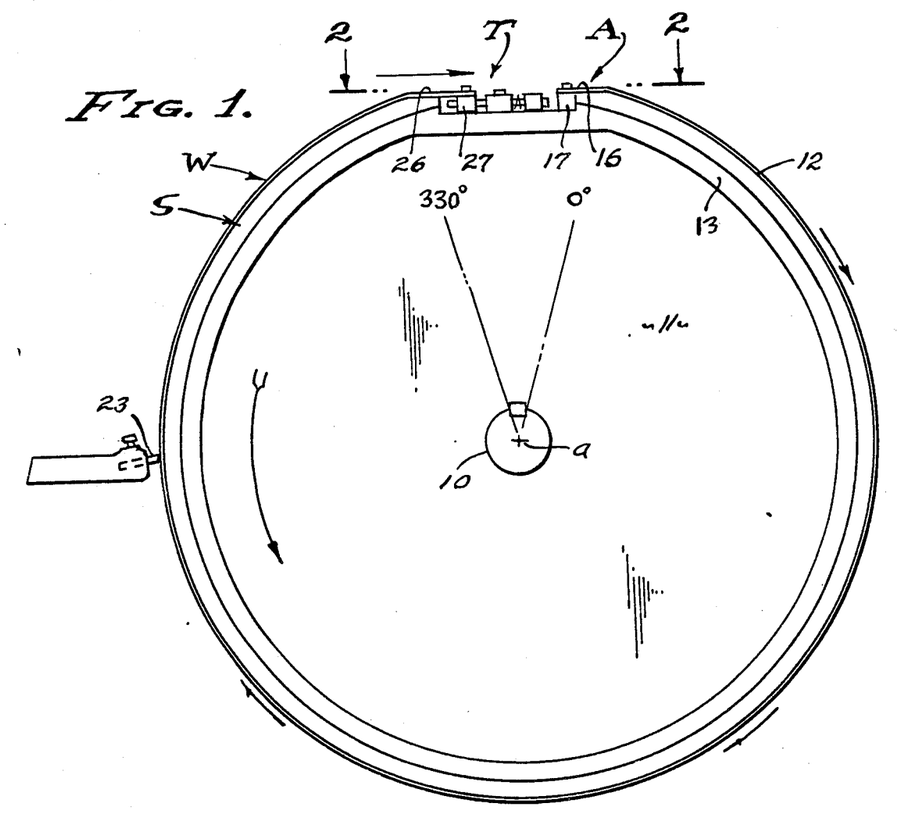
FIG. 1 is an axial end view of a typical apparatus for conducting the method for making irregular sections.
Figure 3:
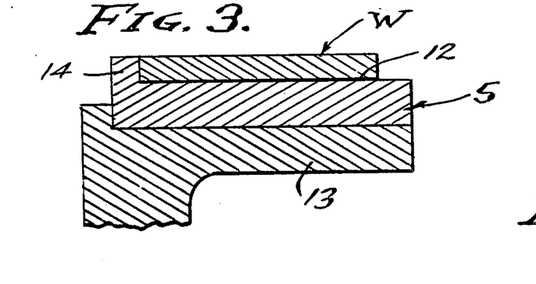
FIGS. 3 through 9 are enlarged detailed views showing the support and forming of irregular sections, FIG. 3 showing support of a work piece blank, FIG. 4 showing a tapered forming of the blank, FIG. 5 showing the formed work piece of FIG. 4 removed from the support, FIG. 6 showing a convex forming of the blank, FIG. 7 showing roll forming of the work piece removed from FIG. 6, FIG. 8 showing a concaved forming of the work piece removed from FIG. 6, and FIG. 9 showing the finished work piece removed from either FIG. 7 or FIG. 8.
Figure 4:
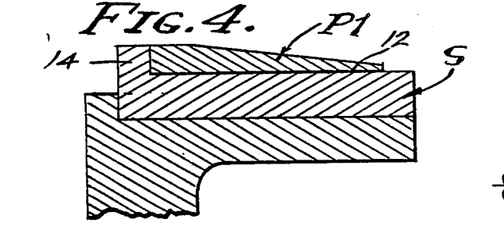

The workpiece W can vary widely in cross section, a simple workpiece of rectangular cross section being shown in FIG. 3, coextensively engaged upon the supporting face 12 and positioned against the locating rib 14. The workpiece W passes over the unobstructed front edge of the support S to engage firmly against the locating rib 14, a typical workpiece being 3 inches wide and 0.040 inch thick, and portions of which are reduced to 0.020 inch thickness, and/or tapered to a sharp edge as shown. The workpiece length is limited only by the arcuate extent of the supporting face 12. As shown in FIG. 1 of the drawings, the effective arcuate sector presenting an uninterrupted support surface 12 is 330°, all of which can vary as required.

Figure 2:
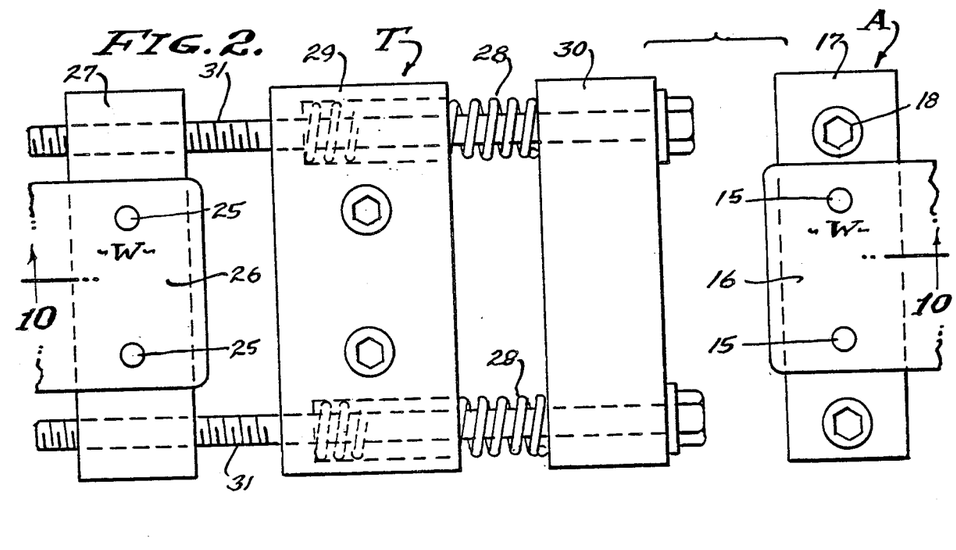
FIG. 2 is an enlarged view taken as indicated by line 2—2 on FIG. 1.
Figure 10:
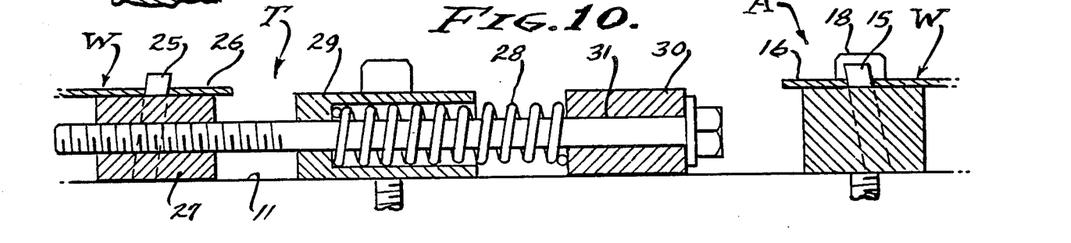
FIG. 10 is a sectional view taken as indicated by line 10—10 on FIG. 2.

The anchor means A as best shown in FIGS. 2 and 10 of the drawings, can be at least one pin 15 or the like engaged through an opening in the starting end portion 16 of the workpiece W. The starting portion is at 0° as shown in FIG. 1, at which position the anchor means A is located by a fixed block 17 or the like secured to the wheel flange 13 as by cap screws 18. The elongated workpiece W extends clockwise and away from the anchor means A and circumferentially to the tensioning means T next described. The anchor means A can take forms such as clamp jaws, screw fasteners, or hook devices etc., or simply as a weldment.

The tensioning means T also as shown in FIGS. 2 and 10 can be a spring means by which circumferential tension is exerted upon the workpiece W. The tensioning means T is essentially a take-up anchor, and it is shown as at least one pin 25 or the like engaged through an opening in the finishing portion 26 of the workpiece W. The finishing portion is at 330° as shown in FIG. 1, at which position the tensioning means T includes a take-up block 27 or the like pulled in a clockwise direction by a spring or springs 28. As shown, there is a pair of compression springs 28 bearing in a seat block 29 from which they project to yieldingly urge a header block 30 in a clockwise direction. Circumferentially adjustable pull rods 31 extend through the springs and are guided through openings in the seat block 29 to threadedly engage into the take-up block 27 for adjustment. Accordingly, the tensioning means T exerts circumferential force upon the workpiece W, pulling it tight in a clockwise direction from the anchor means A.

Figure 5:
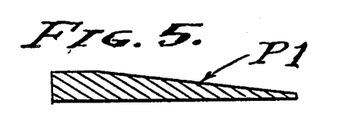
Figure 6:
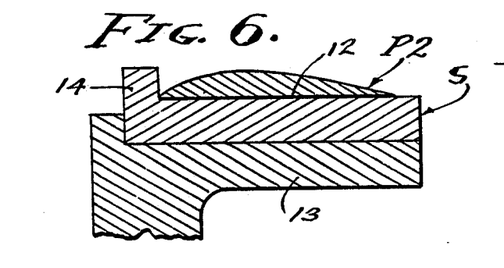
Figure 7:
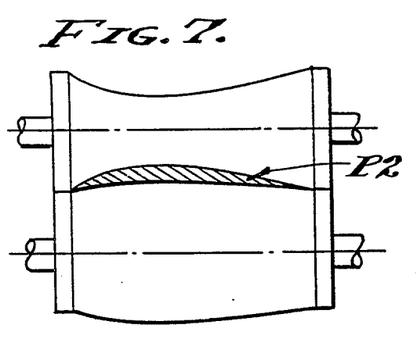
Figure 8:
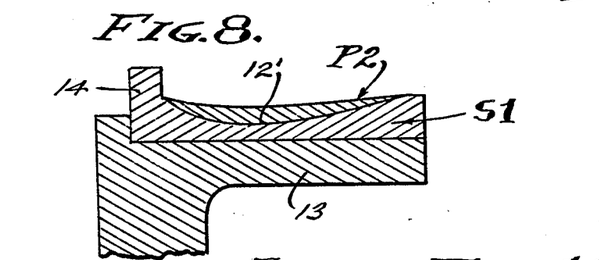
Figure 9:
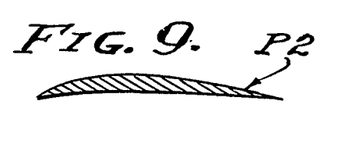

The cutting means C can vary as above stated and is shown as a single point tool 33 for example. It is to be understood that the tool 33 is carried and positioned as shown by a tool post or holder, and that it is fed by a carriage (not shown). For example, the workpiece W of FIG. 3 can be machined by tool 33 into the cross sectional configuration of part P1 shown in FIG. 4 and later removed from the support S as shown in FIG. 5 as a finished part. Or, the workpiece W of FIG. 3 can be machined by tool 33 into the cross sectional configuration of part P2 as shown in FIG. 6 and then removed to a form rolling operation as shown in FIG. 7 to produce the finished part as shown in FIG. 9. A modified convexly curved support S1 with a concaved face 12' is shown in FIG. 8 to receive the machined part P2 of FIG. 6 which is reversed or turned over for machining the previous inside thereof to the transverse cross section desired, in this instance a concaved face producing the typical turbine blade cross section shown in FIG. 9. It will be understood that the cross sectional configurations are essentially infinite, characterized by thin sections and sharp edges in the finished part.

Figure 11A:
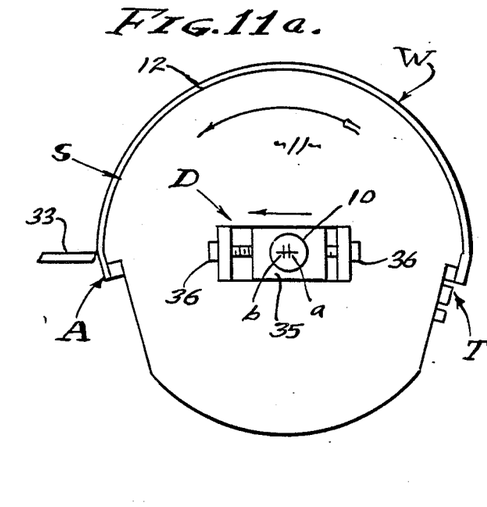
FIGS. 11a and 11b are views illustrating the formation of tapered part pieces by means of eccentric turning of the support.
Figure 11B:
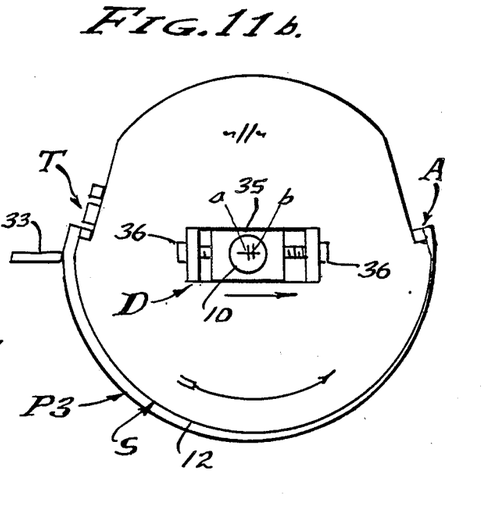

Referring now the the method and apparatus as it is shown in FIGS. 11a and 11b, tapered parts P3 are produced from the workpiece W. In this embodiment the center b of wheel 11 is eccentrically located with respect to the center turning axis a of the lathe spindle 10 (closely related as shown). The offset axes a and b determine the amount of taper in the machined part P3. The workpiece W of uniform cross section is shown in FIG. 11a, anchored at A and pulled tightly onto the arcuate semi-circular support S and its convex surface 12 by the tensioning means T, all as hereinabove described. In practice, the eccentricity is determined by adjustment means D shown in the drawings as a guide 35 rotated by the spindle 10 and upon which the wheel slides diametrically under control of an adjustment screw or opposed set screws 36. It is to be understood that there are various ways to mount and adjustably position the wheel 11 eccentrically to the axis of rotation. Turning of workpiece W on the support surface 12 that is concentric with respect to axis b and eccentric with respect to axis a produces the circumferentially and/or longitudinally tapered part P3 as shown in FIG. 11b. Also, transverse tapering of the elongated workpiece W is produced by feeding the tool 33 angularly with respect to the turning axis a. Accordingly, the part P3 can be tapered both longitudinally and transversely in right angularly related directions.

Figure 12A:
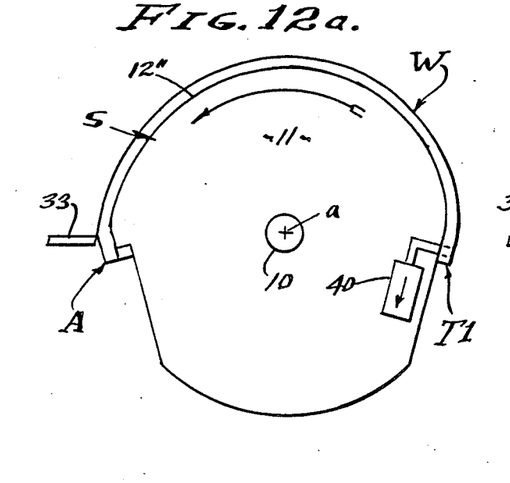
FIGS. 12a and 12b are views illustrating the formation tapered part pieces by means of concentric turning of the support.
Figure 12B:
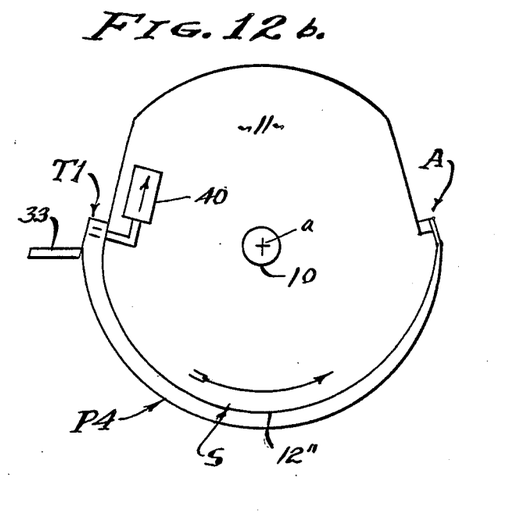

Referring now to the method and apparatus as it is shown in FIGS. 12a and 12b, contoured parts P4 are produced from the workpiece W. In this embodiment the wheel 11 is revolved concentrically on the turning axis a, and the elongated curvature of the finished part P4 is determined by an involutely curved face 12" of the support S. The workpiece W of uniform cross section is pulled tightly onto the involutely curved support S and its curvilinear surface 12" by the tensioning means T, all as hereinabove described. The involute curvature of face 12" determines the longitudinal outside curvature of part P4 which is turned on the center axis a. Also, transverse tapering of the elongated workpiece W is produced by feeding the tool 33 angularly with respect to the turning axis a. Accordingly, the part P4 can be contoured longitudinally and simultaneously tapered or contoured transversely.

Figure 13:
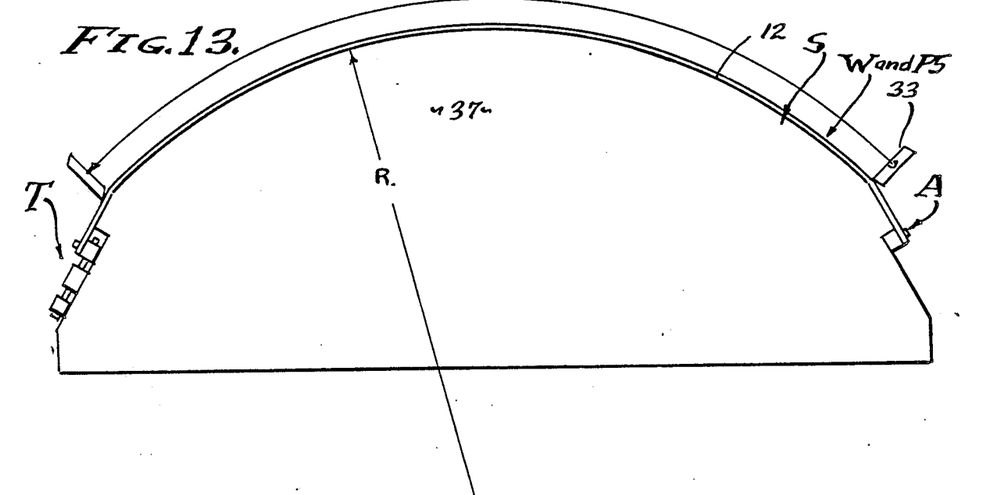
FIGS. 13 and 14 are views illustrating the formation longitudinally and/or transversely irregular work pieces by means of rectilinear movement of a forming tool. And, FIG. 15 is a diagram of pressure means to apply tension to the work piece.

Referring now to the method and apparatus as it is shown in FIG. 13, tapered parts P5 are produced from the workpiece W by rectilinear movement of the cutting tool 33 with respect to the elongated workpiece. In this embodiment the surface 12 of the support S is arcuate as first described, however it is also semi-circular or a segment 37 as shown. Surface 12 is formed or generated about the axis a and the workpiece W is anchored at opposite ends to the arc where the chord of the segment terminates at anchor means A and at the tensioning means T. The tool 33 progressively cuts from anchor means A to the tensioning means T, all as hereinabove described. It is to be understood that the cutting tool 33 follows the convexly arcuate contour of the surface 12, as governed by state of the art controls, for example by computerized control means (not shown) which determines disposition of the tool with respect to the workpiece.

Figure 14:
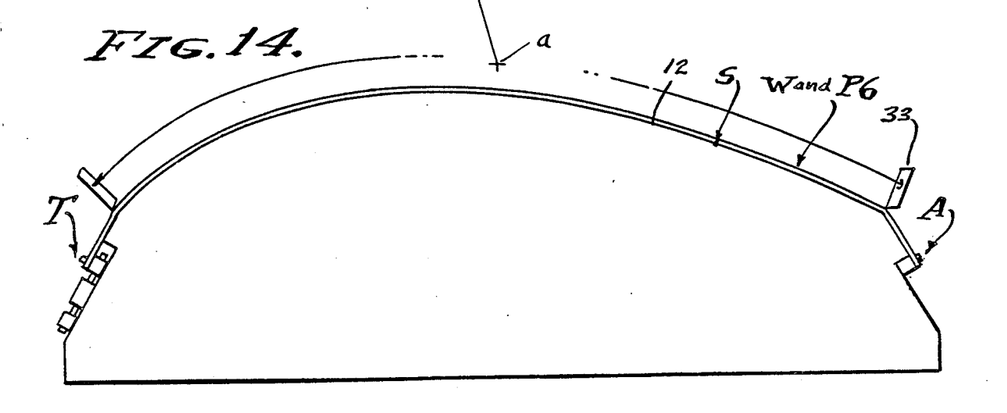

Referring now to the method and apparatus as it is shown in FIG. 14, contoured parts P6 are produced from the workpiece W by rectilinear movement of the cutting tool 33 with respect to the elongated workpiece W. In this embodiment the surface 12 of support S is convexly curvilinear with increasing and/or decreasing curvature between its anchor ends, and which terminate at anchor means A and at tensioning means T. The tool 33 progressively cuts from anchor means A to the tensioning means T, all as hereinabove described. And, it is to be understood that the cutting tool 33 follows the convexly arcuate contour of the surface 12, as governed by state of the art controls, for example by computerized control means (not shown) which determines disposition of the tool with respect to the workpiece.

Figure 15:
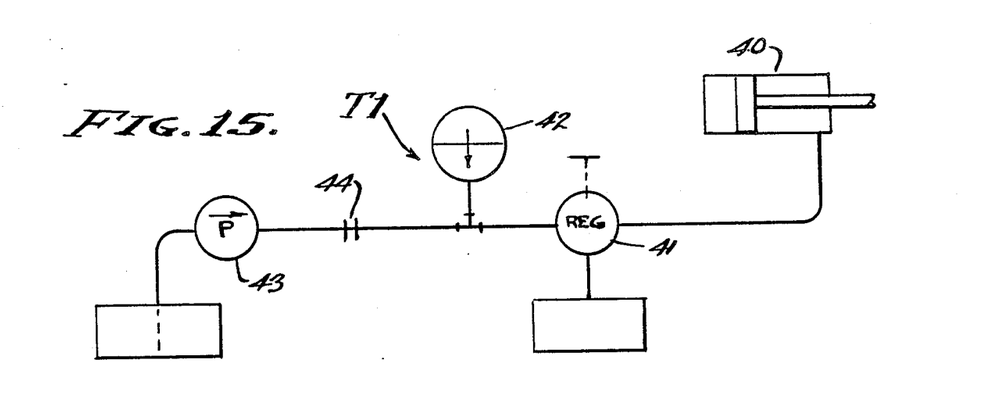

Referring now to FIG. 15 of the drawings, the tensioning means T1 is shown as a hydraulic means which controllably applies dynamic pulling force to the workpiece, as shown in FIGS. 12a and 12b. Tensioning means T1 is carried by the support S or wheel 11 and is comprised of a cylinder and piston means 40 in lieu of the spring 28 and rods hereinabve described. That is, the piston and rod operate the block 27 to apply pulling force to the end 26 of the workpiece W. Hydraulic pressure is addmitted to the cylinder by a adjustable pressure regulator 41 supplied by a pressure accumulator 42, or directly from a pressure pump 43. In practice, the pump 43 is connected to the wheel or cylinder through a coupling 44 which is detachable or is rotatable as may be required. Accordingly, the fluid pressure can be established to apply force above or below the elastic limit and/or yield point of the workpiece material, as may be required.

From the foregoing is will be understood how thin fragile cross sections of any material can be machined and formed into irregular sections characterized by thin walls and sharp edges. Clamping of workpieces in chucks and vices, or held by adhesives, is eliminated. A feature is the tight securement of the workpiece on a convexly curved surface, by means of tensioning the workpiece between its anchored ends. The tensioning is dynamic, in that it inherently compensates for any stretching of the workpiece as may be caused by pressures applied by the cutting tool moving away from an anchored end of the workpiece. Accordingly, longitudinal as well as transverse contours can be machined into such fragile workpieces, all as circumstances require.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A method of machining fragile elongated sections of material into irregular cross sections, and including;
   the first step of placing an elongated workpiece of said material over a convexly curved support,
   the second step of anchoring opposite ends of the workpiece at opposite ends of the convexely curved support for its coextensive engagement upon the support between the opposite ends thereof,
   the third step of tensioning the workpiece and removing slack between its opposite anchored ends,
   and the fourth step of removing material from the workpiece by movement of a cutting tool away from an anchored end of the workpiece while maintaining tension in the workpiece by the third step and thereby preventing slack therein.

2. The method of machining fragile material as set forth in claim 1, wherein the workpiece is of flexible material and is pulled into conformity with the convexly curved support by the third step of tensioning.

3. The method of machining fragile material as set forth in claim 1, wherein the convexly curved support is arcuate for turning of the workpiece about a center.

4. The method of machining fragile material as set forth in claim 1, wherein the convexly curved support is curvilinear for rectilinear removal of material from the workpiece.

5. The method of machining fragile material as set forth in claim 1, wherein the workpiece is fixedly anchored at one end and the third step of tensioning is applied to the anchored other end of the workpiece.

6. The method of machining fragile material as set forth in claim 1, wherein the third step of tensioning is by spring means yieldingly exerting longitudinal strain to the workpiece between the opposite anchored ends thereof.

7. The method of machining fragile material as set forth in claim 1, wherein the third step of tensioning is by controlled means exerting a determined longitudinal strain to the workpiece between the opposite ends thereof.

8. The method of machining fragile material as set forth in claim 7, wherein the determined longitudinal strain to the workpiece is less than the elastic limit of the material, whereby said material will return to its original shape.

9. The method of machining fragile material as set forth in claim 7, wherein the determined longitudinal strain to the workpiece is less than the yield strength of the material, whereby said material will return to its original shape.

10. The method of machining fragile material as set forth in claim 7, wherein the determined longitudinal strain to the workpiece is greater than the yield strength of the material and setting the material to the convexly curved support, whereby the workpiece is formed to a configuration.

11. An apparatus for machining fragile elongated sections of material into irregular cross sections, and including;
    support means comprised of a convexly curved surface upon which an elongated workpiece is placed,
    anchoring means at opposite ends of the support means surface to engage with opposite end portions of the workpiece,
    tensioning means applying longitudinal strain to the workpiece and removing slack between said anchoring means engaged with its opposite end portions,
    and material removal means comprised of a cutting tool movable away from one anchoring means and exerting force toward the other anchoring means, while the tensioning means maintains strain away from said one anchoring means, thereby preventing any slack in the workpiece.

12. The apparatus for machining fragile material as set forth in claim 11, wherein the support means surface is arcuate and concentric about an axis on which the cutting tool revolves with respect to the workpiece.

13. The apparatus for machining fragile material as set forth in claim 11, wherein the support means is a wheel rotated by a spindle and having a circumferential periphery forming the convexly curved surface upon which the workpiece is placed and tensioned.

14. The apparatus for machining fragile material as set forth in claim 13, wherein the support means is a fixture in the form of a tire affixed to the wheel and upon which the workpiece is placed and tensioned.

15. The apparatus for machining fragile material as set forth in claim 11, wherein the anchor means at one end of the support means is fixed with respect thereto and the anchor means at the other end of the support means is movable by the tensioning means to apply and maintain the longitudinal strain to the workpiece.

16. The apparatus for machining fragile material as set forth in claim 11, wherein the tensioning means is a spring means moving said other anchor means away from said one anchoring means to apply and maintain the longitudinal strain to the workpiece.

17. The apparatus for machining fragile material as set forth in claim 11, wherein the tensioniing means is a controlled means exerting and maintaining a determined longitudinal strain to the workpiece between the opposite ends thereof.

18. The apparatus for machining fragile material as set forth in claim 11, wherein the tensioning means is a fluid operated means exerting and maintaining a determined longitudinal strain to the workpiece between the opposite ends thereof.

19. The apparatus for machining fragile material as set forth in claim 11, wherein the tensioning means is a hydraulic means exerting and maintaining a determined longitudinal strain to the workpiece between the opposite ends thereof.

20. The apparatus for machining fragile material as set forth in claim 13, wherein the tensioning means is a spring means carried by the wheel and moving said other anchor means away from said one anchor means to apply and maintain the longitudinal strain to the workpiece.

21. The apparatus for machining fragile material as set forth in claim 13, wherein the tensioning means is a controlled means carried by the wheel and moving at least one of the anchoring means to apply and maintain the longitudinal strain to the workpiece.

22. The apparatus for machining fragile material as set forth in claim 13, wherein the tensioning means is carried by the wheel and is a fluid operated means exerting and maintaining a determined longitudinal strain to the workpiece between the opposite ends thereof.

23. The apparatus for machining fragile material as set forth in claim 13, wherein the tensioning means is carried by the wheel and is a hydraulic means exerting and maintaining a determined longitudinal strain to the workpiece between the opposite ends thereof.

24. The apparatus for machining fragile material as set forth in claim 11, wherein the support means surface is arcuate and eccentrically positioned about an axis on which the cutting tool revolves with respect to the workpiece.

25. The apparatus for machining fragile material as set forth in claim 11, wherein the support means surface is arcuate about a center, there being adjustment means positioning the center eccentrically about an axis on which the cutting tool revolves with respect to the workpiece.

26. The apparatus for machining fragile material as set forth in claim 11, wherein the support means surface is involute and concentrically positioned about an axis on which the cutting tool revolves with respect to the workpiece.

27. The apparatus for machining fragile material as set forth in claim 11, wherein the support means surface is involute and eccentrically positioned about an axis on which the cutting tool revolves with respect to the workpiece.

28. The apparatus for machining fragile material as set forth in claim 11, wherein the support means surface is involute about a center, there being adjustment means positioning the center eccentrically about an axis on which the cutting tool revolves with respect to the workpiece.

29. The apparatus for machining fragile material as set forth in claim 11, wherein the support means is a segment with its surface concentric about an axis from which the cutting tool moves longitudinally with respect to the elongated workpiece.

30. The apparatus for machining fragile material as set forth in claim 11, wherein the support means is a segment with its surface arcuate about a center eccentrically positioned about an axis from which the cutting tool moves longitudinally with respect to the elongated workpiece.

31. The apparatus for machining fragile material as set forth in claim 11, wherein the support means surface is linear and over which the cutting tool moves rectilinearly with respect to the elongated workpiece.

32. The apparatus for machining fragile material as set forth in claim 11, wherein the support means surface is curvilinear and over which the cutting tool moves rectilinearly with respect to the elongated workpiece.

33. A method of maching fragile elongated turbine blades and the like, and including;
the first step of placing an elongated workpiece of blade material over a convexly curved support,
the second step of anchoring opposite ends of the workpiece at opposite ends of the convexly curved support for its coextensive engagement upon the support between the opposite ends thereof,
the third step of tensioning the workpiece and removing slack between its opposite anchored ends,
and the fourth step of removing material transversely and convexly from an exposed side of the elongated workpiece by movement of a cutting tool away from an anchored end of the workpiece while maintaining tension in the workpiece by the third step and thereby preventing slack therein and thereby establishing a convex side thereof.

34. The method of machining turbine blades and the like as set forth in claim 33, wherein the fourth step is followed by a fifth step of forming the elongated workpiece having said convex side between concave and convex shaped forming tools and thereby establishing a concavo-convex cross section of the blade.

35. The method of machining turbine blades and the like as set forth in claim 33, wherein the fourth step is followed by a fifth step of forming the elongated workpiece having said convex side between concave and convex shaped forming rollers and thereby establishing a concavo-convex cross section of the blade.

36. The method of maching turbine blades and the like as set forth in claim 33, wherein the fourth step is followed by a fifth step of replacing the elongated workpiece over a convexly curved support fitted to the established convex side of the workpiece, followed by the sixth step of anchoring opposite ends of the workpiece at opposite ends of the convexly curved support for its coextensive engagement upon the support between the opposite ends thereof, the seventh step of tensioning the workpiece between its opposite anchored ends, and the eighth step of removing material transversely and concavedly from an exposed side of the elongateds workpiece by movement of a cutting tool away from an anchored end of the workpiece while maintaining tension in the workpiece by the seventh step and thereby preventing slack therein and thereby establishing a concavo-convex cross section of the blade.

* * * * *